(12) United States Patent
Kim

(10) Patent No.: US 10,707,545 B2
(45) Date of Patent: Jul. 7, 2020

(54) SYSTEM FOR PROVIDING COOLING AIR IN A BATTERY SYSTEM

(71) Applicant: LG CHEM, LTD., Seoul (KR)

(72) Inventor: Jihun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 328 days.

(21) Appl. No.: 15/510,118

(22) PCT Filed: Oct. 22, 2015

(86) PCT No.: PCT/KR2015/011213
§ 371 (c)(1),
(2) Date: Mar. 9, 2017

(87) PCT Pub. No.: WO2016/064225
PCT Pub. Date: Apr. 28, 2016

(65) Prior Publication Data
US 2017/0301967 A1     Oct. 19, 2017

(30) Foreign Application Priority Data

Oct. 22, 2014   (KR) .................... 1 0-201 4-01 43658

(51) Int. Cl.
*H01M 10/63*       (2014.01)
*H01M 10/6563*     (2014.01)
(Continued)

(52) U.S. Cl.
CPC ....... *H01M 10/63* (2015.04); *H01M 10/6556* (2015.04); *H01M 10/6561* (2015.04);
(Continued)

(58) Field of Classification Search
CPC ............. H01M 10/63; H01M 10/6561; H01M 10/6556; H01M 10/6563; H01M 10/6566; H01M 10/627; H01M 10/486
See application file for complete search history.

(56) References Cited

U.S. PATENT DOCUMENTS 4,376,809 A    3/1983  Bindin
4,463,569 A *  8/1984  McLarty ................. F25B 21/04
                                                    62/3.2
(Continued)

FOREIGN PATENT DOCUMENTS

CN    200976387 Y    11/2007
EP    2 637 248 A1    9/2013
(Continued)

OTHER PUBLICATIONS

European Search Report for Appl. No. 15852288.8 dated Apr. 6, 2018.
(Continued)

*Primary Examiner* — Ljiljana V. Ciric
(74) *Attorney, Agent, or Firm* — Birch, Stewart, Kolasch & Birch, LLP

(57) ABSTRACT

The system for controlling a flow of cooling air in a battery system for cooling the battery system includes: an air conditioning system which includes an outlet discharging cooling air for reducing a temperature of the plurality of battery modules, and an inlet taking in cooling air, of which a temperature is increased, after reducing the temperature of the plurality of battery modules; and a pipe which includes a plurality of module cooling ports connected to the outlet, forming a flow path of the cooling air, and corresponding to the plurality of battery modules, respectively, and makes the cooling air discharged through the outlet pass through each battery module through each module cooling port to cool the plurality of battery modules.

10 Claims, 13 Drawing Sheets

(51) Int. Cl.
*H01M 10/6556* (2014.01)
*H01M 10/6566* (2014.01)
*H01M 10/6561* (2014.01)
*H01M 10/627* (2014.01)
*H01M 10/48* (2006.01)

(52) U.S. Cl.
CPC ... *H01M 10/6563* (2015.04); *H01M 10/6566* (2015.04); *H01M 10/486* (2013.01); *H01M 10/627* (2015.04)

(56) References Cited

U.S. PATENT DOCUMENTS

| | | | | |
|---|---|---|---|---|
| 4,964,431 A * | 10/1990 | Ball | F16K 1/221 | 137/1 |
| 4,976,327 A * | 12/1990 | Abujudom, II | B60K 11/00 | 180/68.2 |
| 5,671,903 A * | 9/1997 | Homma | F16K 31/003 | 251/69 |
| 5,680,030 A * | 10/1997 | Kadouchi | B60L 3/0046 | 320/134 |
| 6,152,096 A * | 11/2000 | Setsuda | B60R 16/04 | 123/184.21 |
| 6,479,185 B1 * | 11/2002 | Hilderbrand | H01M 2/1077 | 429/148 |
| 6,613,472 B1 * | 9/2003 | Watanabe | H01M 10/625 | 429/112 |
| 6,761,992 B1 * | 7/2004 | Marukawa | H01M 2/1077 | 429/159 |
| 6,828,755 B1 * | 12/2004 | Iverson | H01M 16/00 | 320/104 |
| 7,045,236 B1 * | 5/2006 | Andrew | H01M 2/1077 | 429/83 |
| 7,046,470 B2 * | 5/2006 | Yamanashi | G06F 1/20 | 360/69 |
| 7,905,308 B2 * | 3/2011 | Abe | H01M 2/1077 | 180/68.5 |
| 8,722,223 B2 * | 5/2014 | Yang | H01M 2/1077 | 429/72 |
| 9,016,662 B2 * | 4/2015 | Staffiere | F16K 31/055 | 251/129.11 |
| 10,000,138 B2 * | 6/2018 | Tanaka | H01M 10/613 | |
| 10,396,411 B2 * | 8/2019 | Jairazbhoy | H01M 10/625 | |
| 10,483,515 B2 * | 11/2019 | Yoshida | H01M 10/486 | |
| 10,522,799 B2 * | 12/2019 | Hisano | H01M 2/1077 | |
| 2002/0098414 A1 * | 7/2002 | Ovshinsky | B60K 1/04 | 429/223 |
| 2004/0135550 A1 * | 7/2004 | Nishihata | G05D 23/1919 | 320/150 |
| 2004/0257089 A1 * | 12/2004 | Aridome | H01M 10/486 | 324/430 |
| 2005/0202311 A1 * | 9/2005 | Higashino | H01M 2/1077 | 429/99 |
| 2005/0287426 A1 * | 12/2005 | Kim | H01M 2/0247 | 429/149 |
| 2006/0028183 A1 * | 2/2006 | Izawa | B60L 3/0046 | 320/150 |
| 2006/0060236 A1 * | 3/2006 | Kim | H01M 10/486 | 136/203 |
| 2006/0090492 A1 | 5/2006 | Ahn et al. | | |
| 2006/0216582 A1 * | 9/2006 | Lee | H01M 2/1077 | 429/120 |
| 2007/0072061 A1 * | 3/2007 | Shimizu | H01M 2/1077 | 429/62 |
| 2007/0144804 A1 * | 6/2007 | Pike | H01M 2/1072 | 180/170 |
| 2007/0196728 A1 * | 8/2007 | Yang | H01M 2/1072 | 429/120 |
| 2007/0289789 A1 * | 12/2007 | Tsuchiya | B60K 1/04 | 180/68.2 |
| 2008/0003495 A1 * | 1/2008 | Shimizu | H01M 2/1077 | 429/99 |
| 2008/0247135 A1 * | 10/2008 | Inoue | H01M 2/1077 | 361/695 |
| 2008/0280192 A1 * | 11/2008 | Drozdz | B60K 6/28 | 429/62 |
| 2009/0071178 A1 * | 3/2009 | Major | B60H 1/00278 | 62/239 |
| 2009/0078400 A1 * | 3/2009 | Tamura | B60H 1/00278 | 165/287 |
| 2009/0311586 A1 * | 12/2009 | Chung | H01M 2/1077 | 429/120 |
| 2009/0320715 A1 * | 12/2009 | Morita | B60K 1/04 | 105/51 |
| 2010/0003582 A1 * | 1/2010 | Hwang | H01M 2/024 | 429/71 |
| 2010/0129703 A1 * | 5/2010 | Caumont | H01G 2/04 | 429/120 |
| 2010/0203376 A1 * | 8/2010 | Choi | H01M 2/1077 | 429/120 |
| 2010/0241308 A1 * | 9/2010 | Kikuchi | B60H 1/00278 | 701/36 |
| 2010/0291414 A1 * | 11/2010 | Bell | H01M 2/1077 | 429/7 |
| 2010/0297486 A1 * | 11/2010 | Fujii | H01M 10/625 | 429/120 |
| 2011/0014501 A1 * | 1/2011 | Scheucher | B60K 1/04 | 429/7 |
| 2011/0020676 A1 * | 1/2011 | Kurosawa | B60K 1/04 | 429/62 |
| 2011/0045326 A1 * | 2/2011 | Leuthner | H01M 10/613 | 429/72 |
| 2011/0111269 A1 * | 5/2011 | Tse | B60L 3/0007 | 429/50 |
| 2011/0159326 A1 * | 6/2011 | Oya | B60L 3/0007 | 429/82 |
| 2011/0177367 A1 * | 7/2011 | Chung | H01M 2/1077 | 429/83 |
| 2011/0189511 A1 | 8/2011 | Yoon | | |
| 2011/0189521 A1 * | 8/2011 | Lee | H01M 2/1077 | 429/120 |
| 2011/0260731 A1 * | 10/2011 | Alkemade | H01M 2/12 | 324/426 |
| 2011/0262791 A1 * | 10/2011 | Im | H01M 2/1077 | 429/120 |
| 2011/0293974 A1 * | 12/2011 | Yoon | H01M 2/1083 | 429/72 |
| 2011/0293986 A1 * | 12/2011 | Kozu | H01M 2/105 | 429/120 |
| 2011/0318618 A1 * | 12/2011 | Yajima | H01M 2/1077 | 429/72 |
| 2012/0003510 A1 * | 1/2012 | Eisenhour | H01M 10/625 | 429/50 |
| 2012/0003515 A1 * | 1/2012 | Eisenhour | H01M 10/625 | 429/62 |
| 2012/0003516 A1 * | 1/2012 | Eisenhour | H01M 10/625 | 429/62 |
| 2012/0088131 A1 * | 4/2012 | Chung | H01M 2/1077 | 429/72 |
| 2012/0138260 A1 * | 6/2012 | Lee | H01M 10/625 | 165/41 |
| 2012/0188714 A1 * | 7/2012 | Von Borck | H01M 2/1061 | 361/688 |
| 2012/0216999 A1 * | 8/2012 | Yamamoto | B60H 1/00271 | 165/287 |
| 2012/0256569 A1 * | 10/2012 | Kawahara | H01M 10/486 | 318/139 |
| 2013/0017419 A1 * | 1/2013 | Jin | H01M 10/425 | 429/50 |
| 2013/0059190 A1 * | 3/2013 | Kossakovski | H01M 10/425 | 429/120 |
| 2013/0122337 A1 * | 5/2013 | Katayama | H01M 10/625 | 429/83 |
| 2013/0122338 A1 * | 5/2013 | Katayama | H01M 10/625 | 429/83 |
| 2013/0130076 A1 * | 5/2013 | Lee | F16K 11/0856 | 429/62 |

(56) References Cited

U.S. PATENT DOCUMENTS

| | | | | |
|---|---|---|---|---|
| 2013/0216875 A1* | 8/2013 | Kim | B60L 50/64 | 429/83 |
| 2013/0244066 A1* | 9/2013 | Kang | H01M 10/647 | 429/62 |
| 2013/0280564 A1* | 10/2013 | Zheng | H01M 2/1077 | 429/62 |
| 2013/0302653 A1* | 11/2013 | Pham | H02J 7/00 | 429/50 |
| 2013/0309532 A1* | 11/2013 | Chung | H01M 2/1072 | 429/83 |
| 2014/0013773 A1* | 1/2014 | Oh | F25B 21/02 | 62/3.2 |
| 2014/0023905 A1* | 1/2014 | Taniyama | B60L 1/003 | 429/120 |
| 2014/0057151 A1* | 2/2014 | Chung | H01M 10/647 | 429/120 |
| 2014/0069113 A1* | 3/2014 | Oh | B60L 1/003 | 62/3.3 |
| 2014/0072844 A1* | 3/2014 | Oh | H01M 10/6572 | 429/71 |
| 2014/0072845 A1* | 3/2014 | Oh | H01M 2/1077 | 429/71 |
| 2014/0072856 A1* | 3/2014 | Chung | H01M 10/625 | 429/120 |
| 2014/0178721 A1* | 6/2014 | Chung | H01M 2/1077 | 429/71 |
| 2014/0262573 A1* | 9/2014 | Ito | B60K 1/04 | 180/68.5 |
| 2014/0271082 A1* | 9/2014 | Youngquist | H05K 13/0417 | 414/749.1 |
| 2014/0295224 A1* | 10/2014 | Inoue | H01M 10/625 | 429/62 |
| 2014/0308551 A1* | 10/2014 | Schroeder | H01M 10/625 | 429/81 |
| 2014/0308559 A1* | 10/2014 | Hwang | B60H 1/00278 | 429/120 |
| 2014/0322583 A1* | 10/2014 | Choi | B60L 3/0046 | 429/120 |
| 2014/0342195 A1* | 11/2014 | Bhola | H01M 10/625 | 429/50 |
| 2014/0342201 A1* | 11/2014 | Andres | H01M 10/6567 | 429/62 |
| 2014/0342211 A1* | 11/2014 | Choi | H01M 2/1077 | 429/120 |
| 2014/0356652 A1* | 12/2014 | Boddakayala | H01M 2/1077 | 429/50 |
| 2015/0010782 A1* | 1/2015 | Tanigaki | H01M 10/625 | 429/7 |
| 2015/0010795 A1* | 1/2015 | Tanigaki | H01M 10/625 | 429/83 |
| 2015/0060164 A1* | 3/2015 | Wang | B60K 6/405 | 180/65.21 |
| 2015/0064521 A1* | 3/2015 | Watanabe | H01M 2/1077 | 429/72 |
| 2015/0136504 A1* | 5/2015 | Tsujimura | H01M 2/1077 | 180/68.5 |
| 2015/0140375 A1 | 5/2015 | Lee et al. | | |
| 2015/0198372 A1* | 7/2015 | Desikan | F28D 1/0366 | 165/151 |
| 2015/0291019 A1* | 10/2015 | Hatta | B60K 11/06 | 180/68.2 |
| 2015/0303527 A1* | 10/2015 | Maxwell | H01M 10/4257 | 429/50 |
| 2015/0325891 A1* | 11/2015 | Inoue | H01M 10/613 | 180/68.1 |
| 2015/0340745 A1* | 11/2015 | Inoue | H01M 10/6563 | 429/120 |
| 2015/0372356 A1* | 12/2015 | Kossakovski | H01M 10/625 | 136/201 |
| 2016/0006088 A1* | 1/2016 | Boetcher | H01M 10/63 | 165/80.2 |
| 2016/0056516 A1* | 2/2016 | Srinivasan | H01M 10/613 | 429/120 |
| 2016/0064708 A1* | 3/2016 | Miller | H01M 2/1077 | 429/99 |
| 2016/0064709 A1* | 3/2016 | Miller | H01M 2/1077 | 429/100 |
| 2016/0079637 A1* | 3/2016 | Nemesh | H01M 10/625 | 429/62 |
| 2016/0093842 A1* | 3/2016 | Blanco | H01M 2/105 | 429/50 |
| 2016/0093847 A1* | 3/2016 | Gunther | H01M 2/1077 | 429/120 |
| 2016/0093929 A1* | 3/2016 | Obasih | H01M 10/0525 | 429/120 |
| 2016/0093933 A1* | 3/2016 | Iida | H01M 10/625 | 429/71 |
| 2016/0133999 A1* | 5/2016 | Lee | H01M 10/6567 | 429/120 |
| 2016/0134000 A1* | 5/2016 | Lee | H01M 2/1077 | 429/120 |
| 2016/0204478 A1* | 7/2016 | Iguchi | B60L 58/18 | 429/62 |
| 2019/0288359 A1* | 9/2019 | Bass | H01M 10/613 | |

FOREIGN PATENT DOCUMENTS

| | | |
|---|---|---|
| JP | 9-232007 A | 9/1997 |
| JP | 2010-67578 A | 3/2010 |
| JP | 2013-16393 A | 1/2013 |
| JP | 2013-20497 A | 1/2013 |
| JP | 2013-187159 A | 9/2013 |
| KR | 10-2006-0027579 A | 3/2006 |
| KR | 10-2006-0036694 A | 5/2006 |
| KR | 10-2012-0076756 A | 7/2012 |
| KR | 10-2013-0102713 A | 9/2013 |
| KR | 10-2013-0137928 A | 12/2013 |

OTHER PUBLICATIONS

European Office Action dated Mar. 6, 2019 for Application No. 15 852 288.8.

International Search Report for PCT/KR2015/011213 (PCT/ISA/210) dated Feb. 12, 2016.

Written Opinion of the International Searching Authority for PCT/KR2015/011213 (PCT/ISA/237) dated Feb. 12, 2016.

* cited by examiner

[Figure 1]
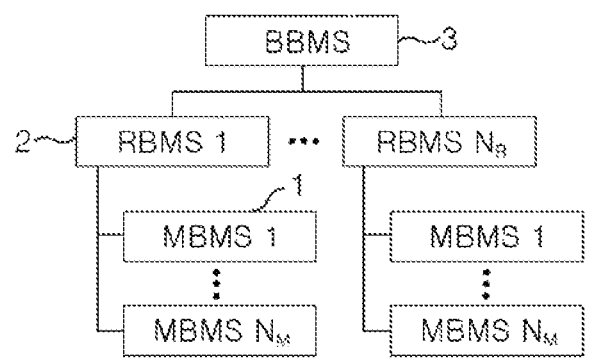

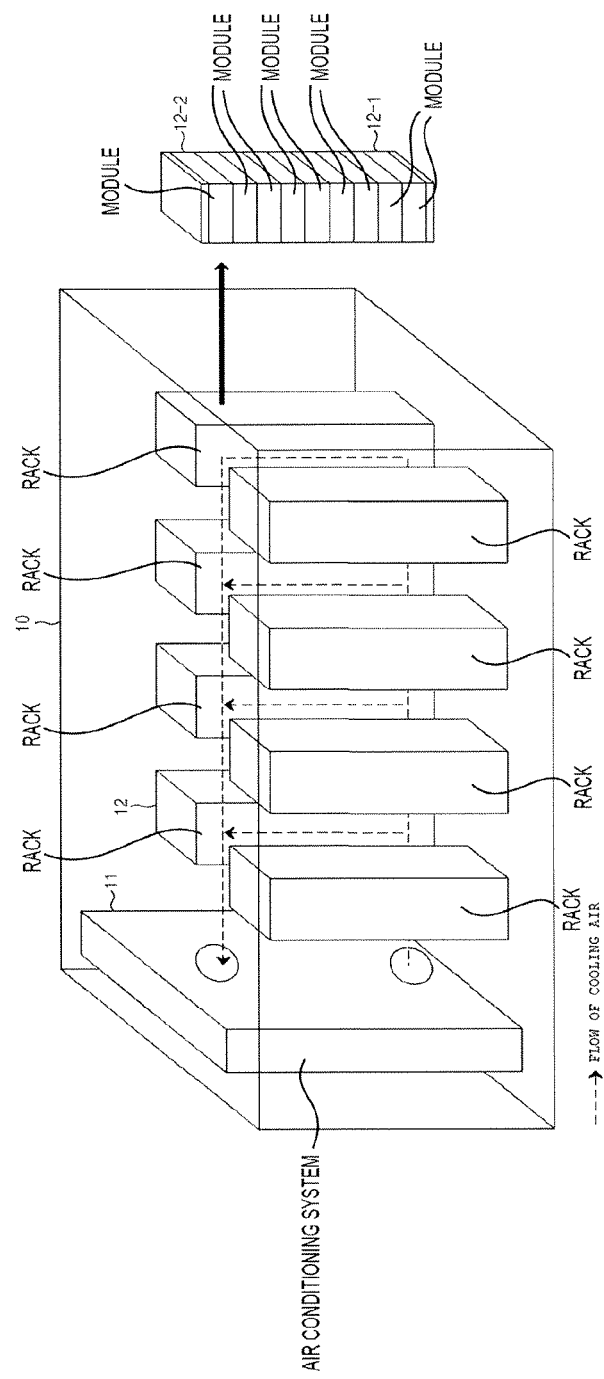
[Figure 2]

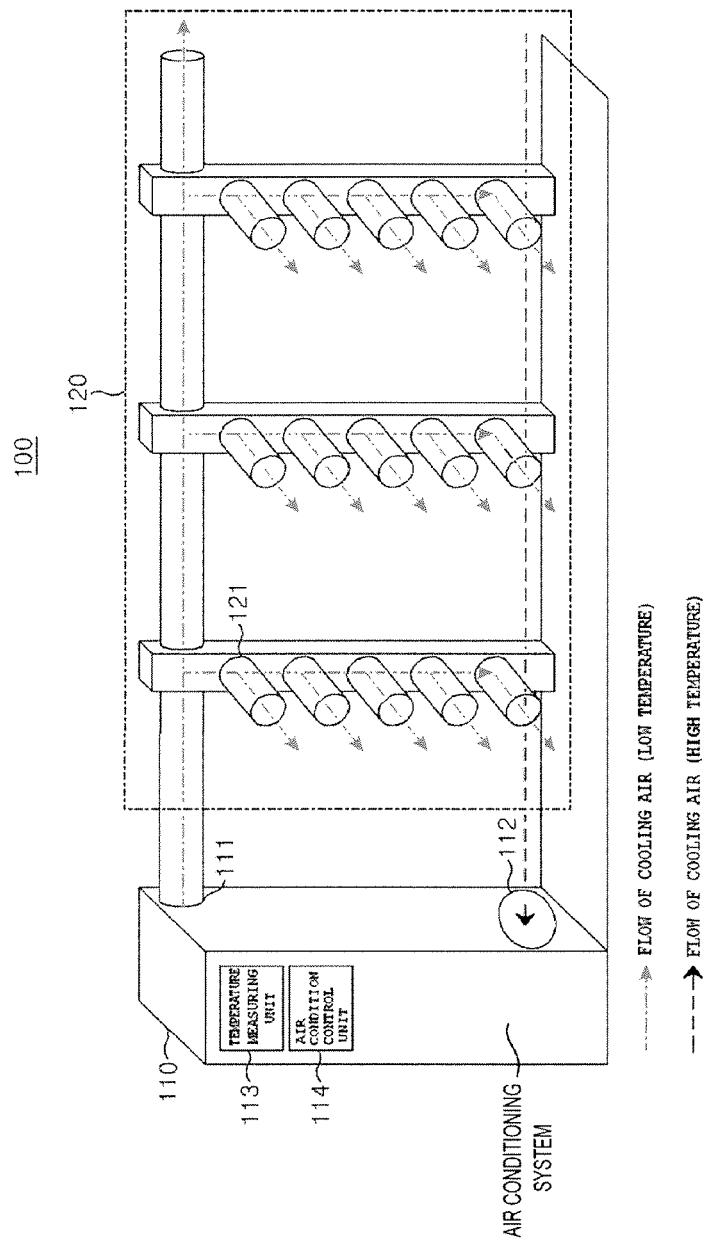
[Figure 3]

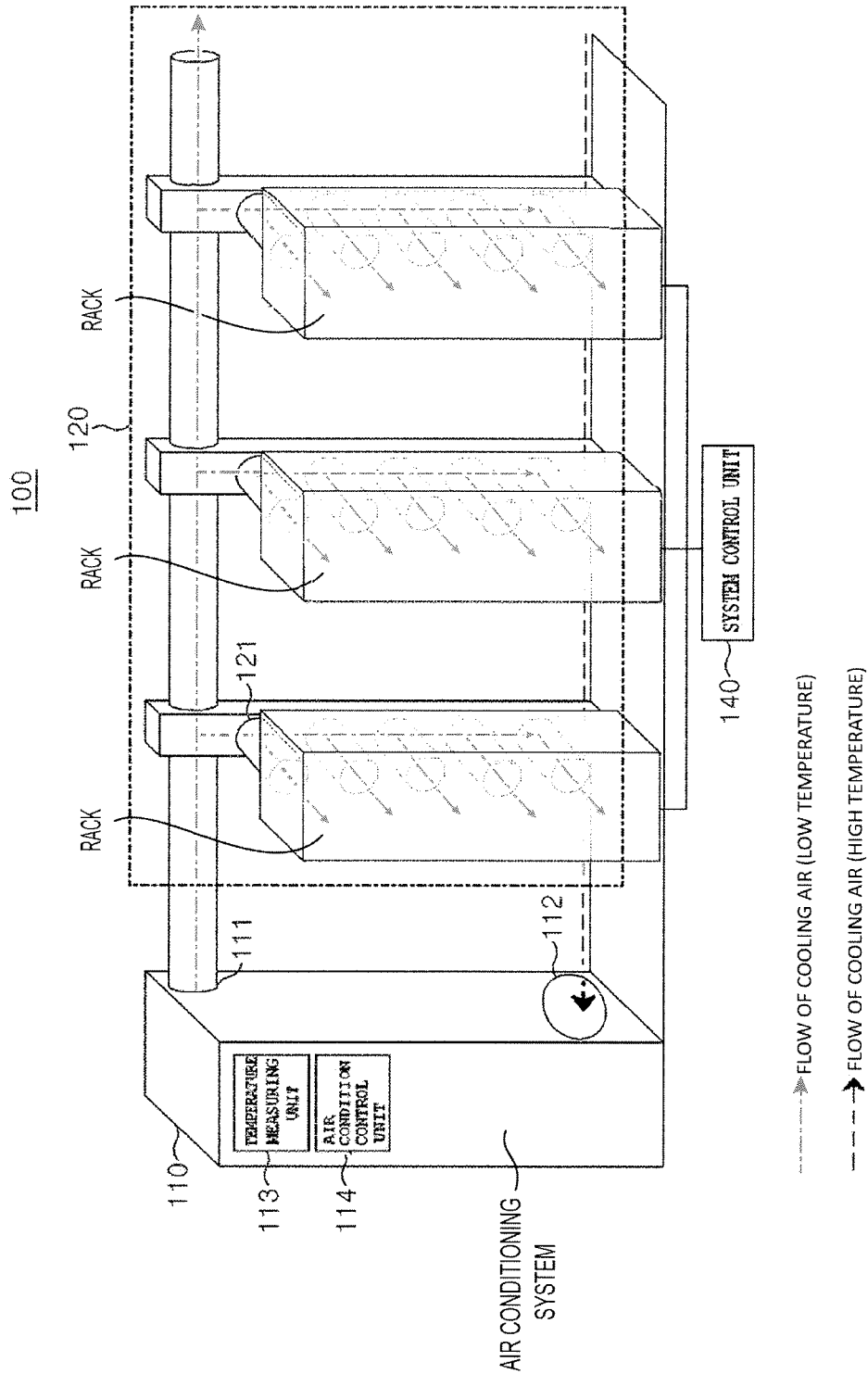

[Figure 5]
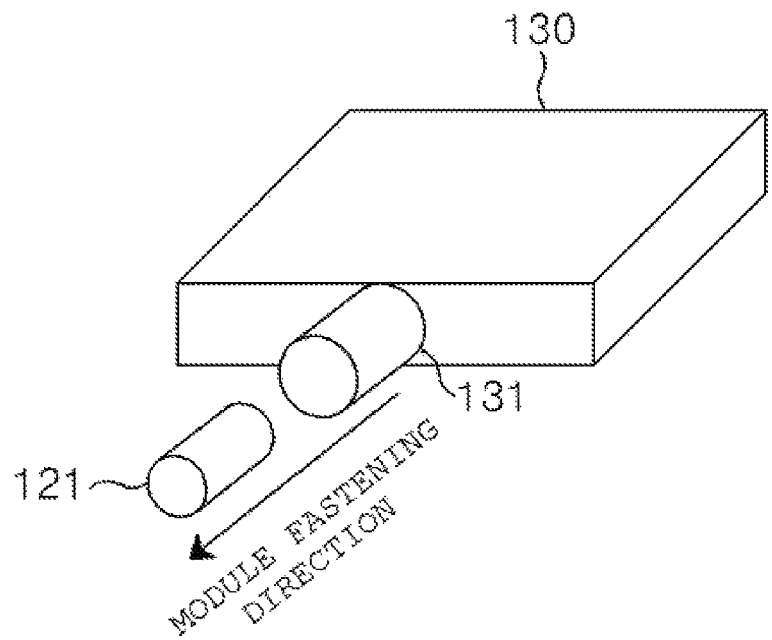
[Figure 6]
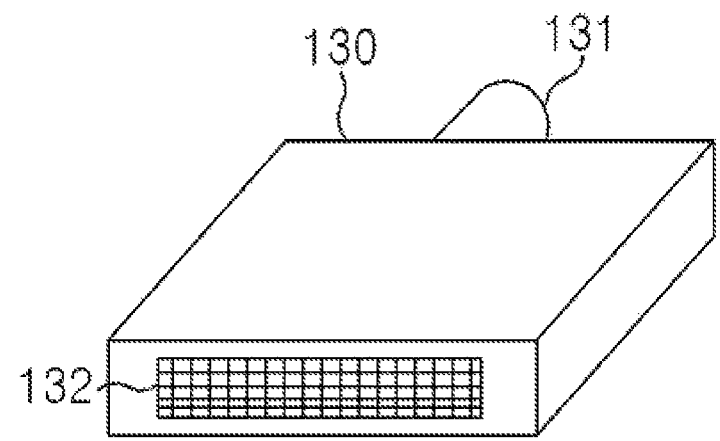

[Figure 7]
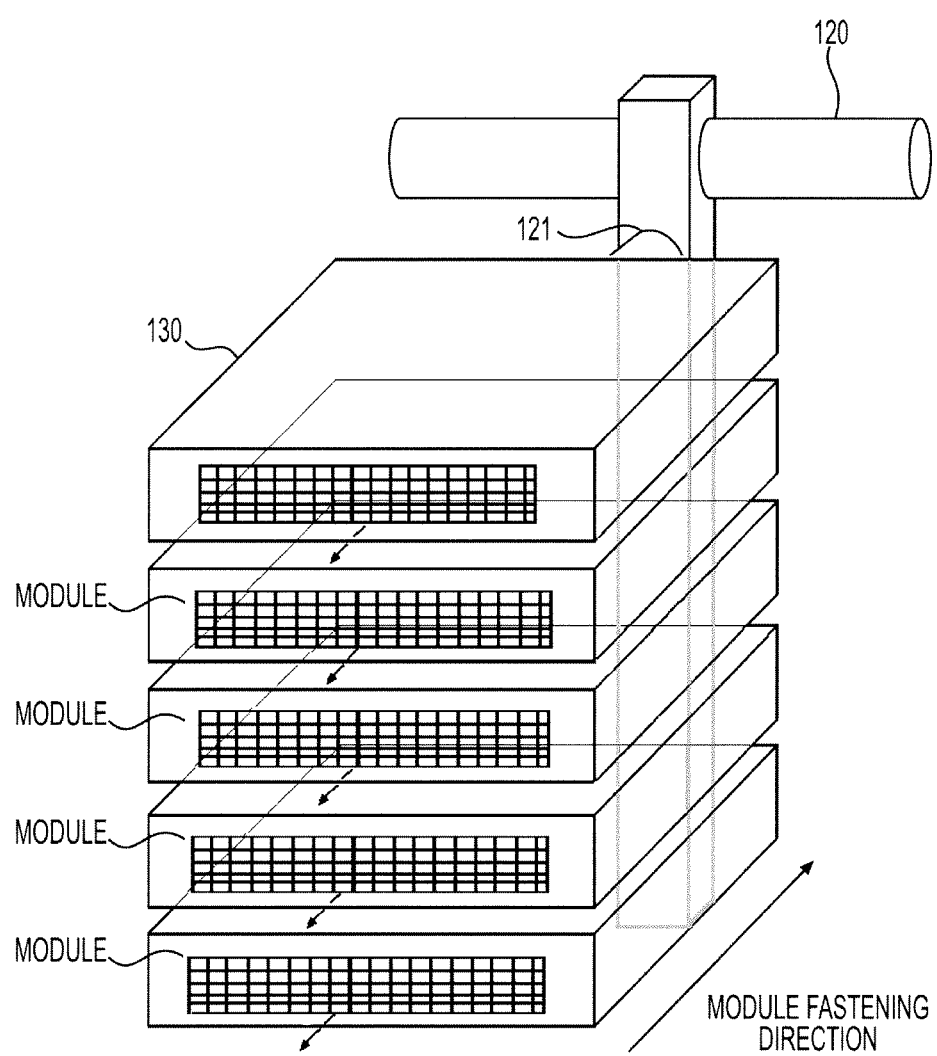

[Figure 8]
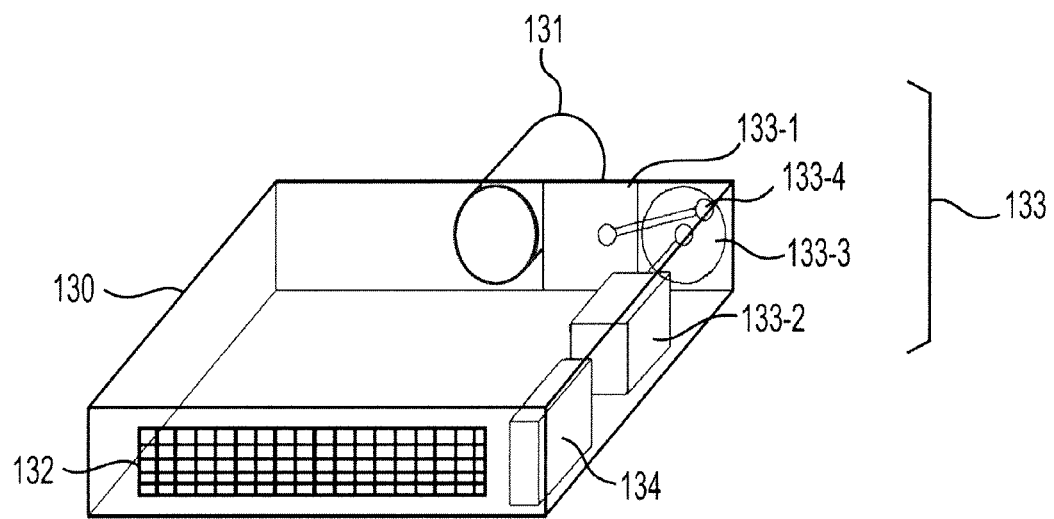
[Figure 9]
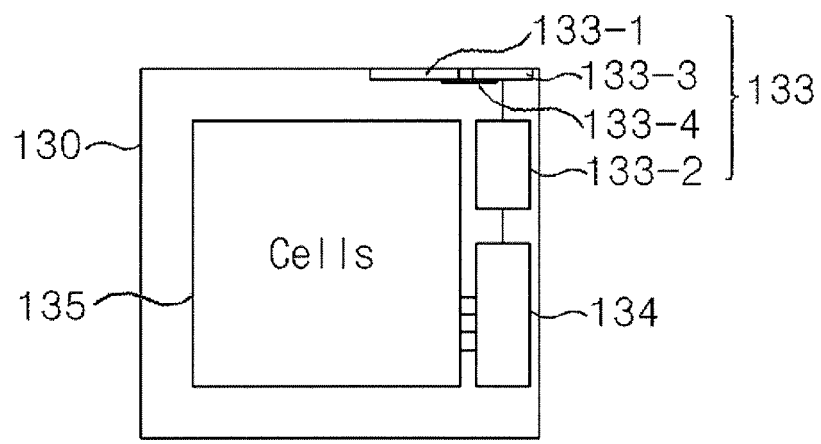

[Figure 10]
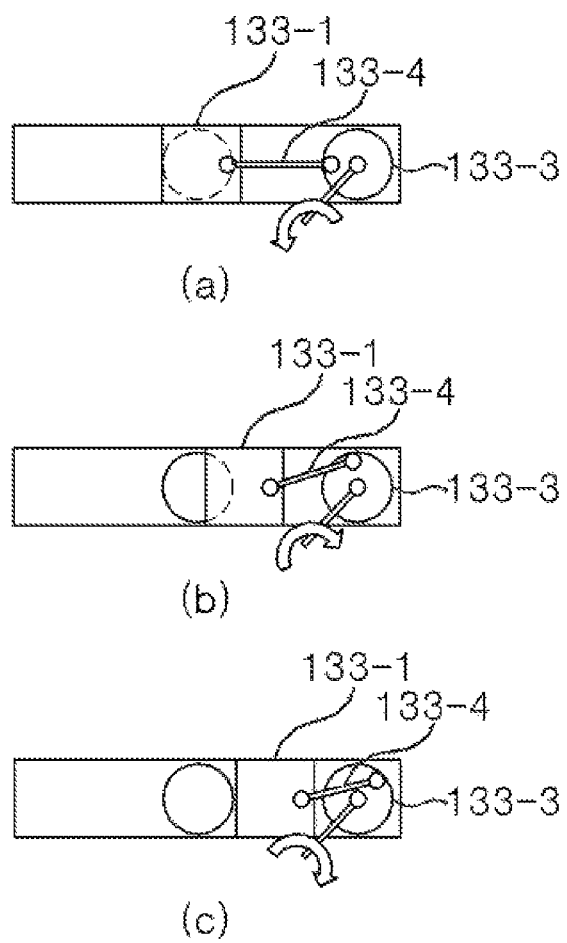

[Figure 11]

|  | Rack1 | Rack2 | ... | RackN_R |
|---|---|---|---|---|
| MODULE 1 | 37.5°C | 36.9°C | ... | 37.8°C |
| MODULE 2 | 37.2°C | 36.8°C | ... | 37.2°C |
| MODULE 3 | 36.8°C | 35.9°C | ... | 36.5°C |
| ... | ... | ... | ... | ... |
| MODULE N_M | 30.2°C | 32.1°C | ... | 31.7°C |
| MT DEVIATION | 7.3°C | 4.8°C | ... | 6.1°C |

[Figure 12]

|  | Rack1 | Rack2 | ... | RackN_R |
|---|---|---|---|---|
| MODULE 1 | 100% | 75% | ... | 100% |
| MODULE 2 | 100% | 75% | ... | 100% |
| MODULE 3 | 75% | 50% | ... | 75% |
| ... | ... | ... | ... | ... |
| MODULE N_M | 0% | 25% | ... | 25% |

[Figure 13]

|  | Rack1 | Rack2 | ... | RackN_R |
|---|---|---|---|---|
| MODULE 1 | 32.2°C | 31.8°C | ... | 32.0°C |
| MODULE 2 | 32.0°C | 31.6°C | ... | 31.3°C |
| MODULE 3 | 31.1°C | 31.7°C | ... | 31.0°C |
| ... | ... | ... | ... | ... |
| MODULE N_M | 30.3°C | 30.5°C | ... | 30.1°C |
| MT DEVIATION | 1.9°C | 1.3°C | ... | 1.9°C |

[Figure 14]

|          | Rack1 | Rack2 | ...  | RackN$_R$ |
|----------|-------|-------|------|-----------|
| MODULE 1 | 100%  | 100%  | ...  | 100%      |
| MODULE 2 | 100%  | 100%  | ...  | 100%      |
| MODULE 3 | 100%  | 100%  | ...  | 100%      |
| ...      | ...   | ...   | ...  | ...       |
| MODULE N$_M$ | 100% | 100% | ... | 100%      |

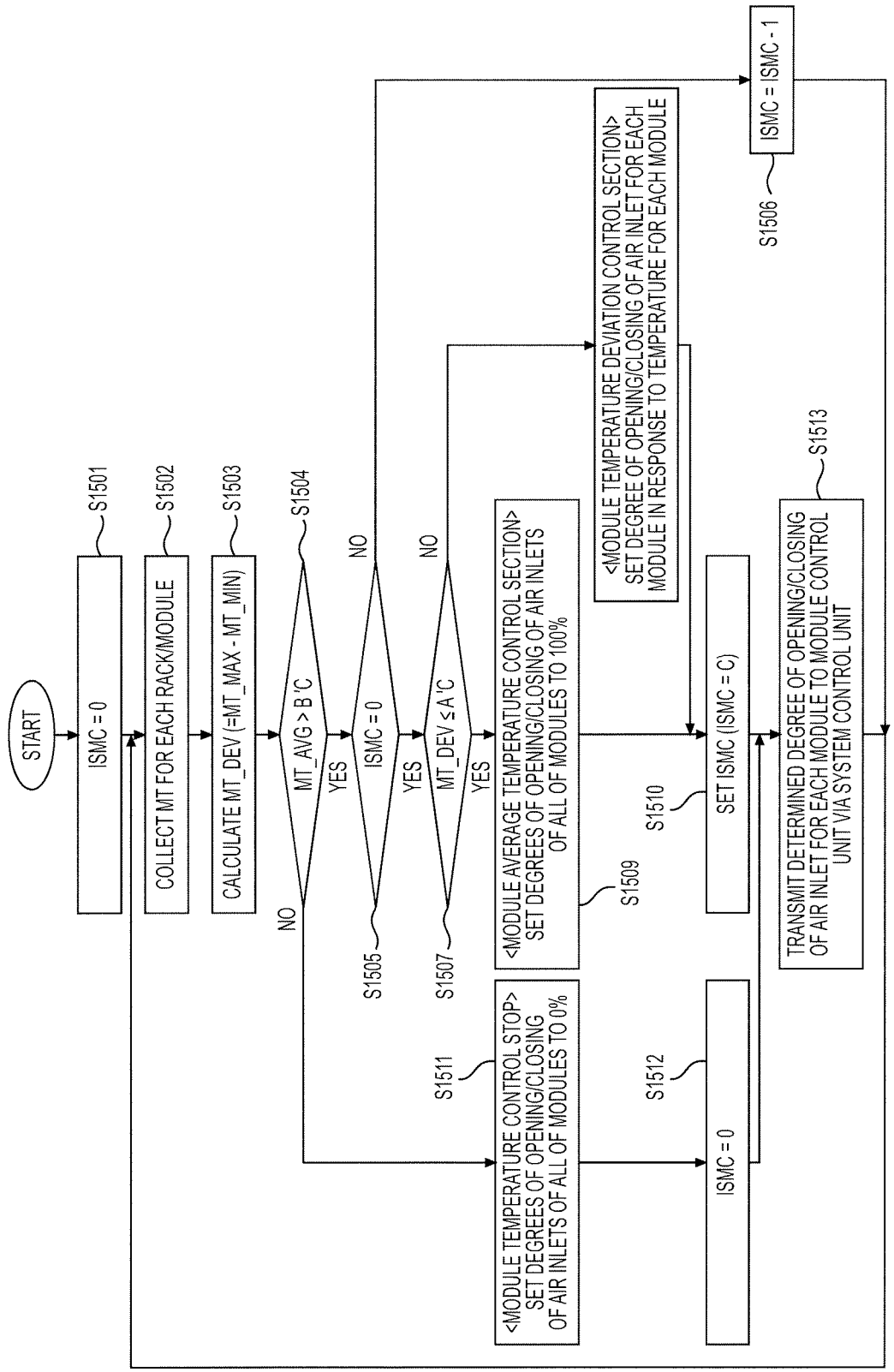
[Figure 15]

[Figure 16]
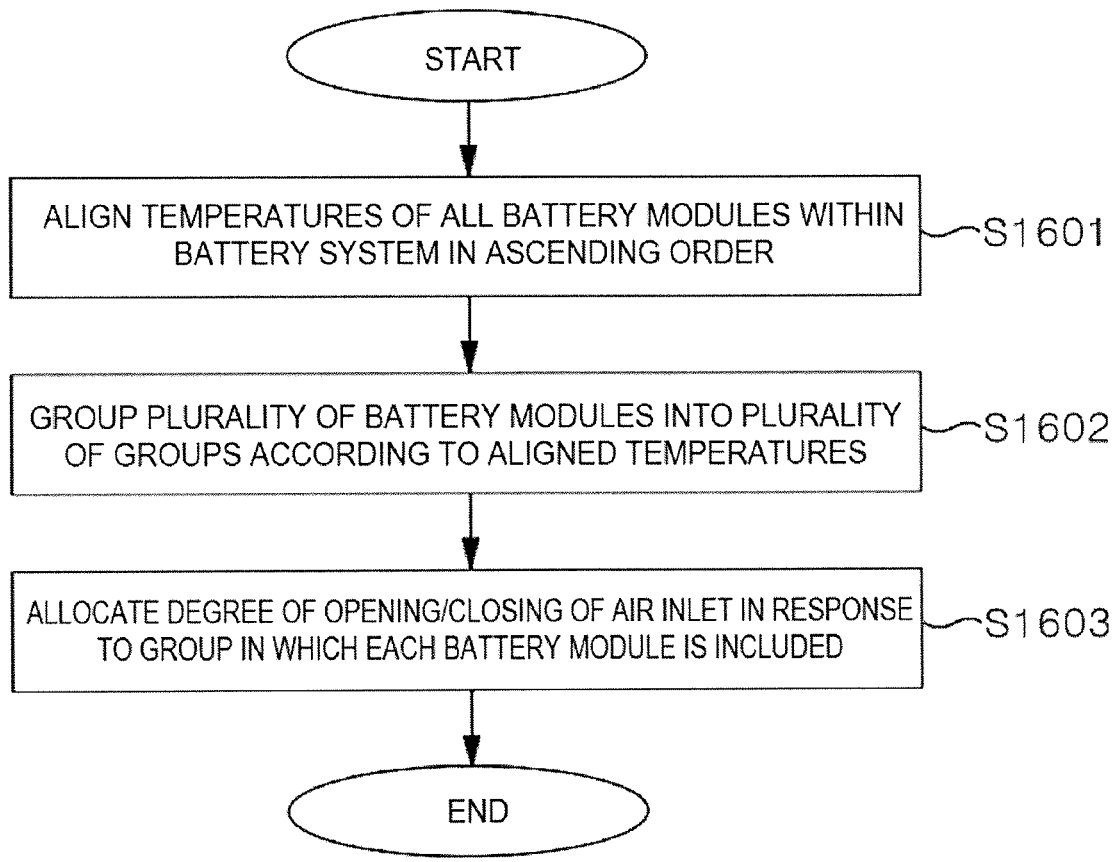
[Figure 17]
|  | Rack1 | Rack2 | ... | RackN_R |
|---|---|---|---|---|
| MODULE 1 | 37.5°C | 36.9°C | ... | 37.8°C |
| MODULE 2 | 37.2°C | 36.8°C | ... | 37.2°C |
| MODULE 3 | 36.8°C | 35.9°C | ... | 36.5°C |
| ... | ... | ... | ... | ... |
| MODULE N_M | 30.2°C | 32.1°C | ... | 31.7°C |
| MT DEVIATION | 7.3°C | 4.8°C | ... | 6.1°C |

[Figure 18]

| ALIGNMENT INDEX | RBMS ID | MEMS ID | TEMPERATURE |
|---|---|---|---|
| 1 | 1 | $N_M$ | 30.2°C |
| 2 | $N_R$ | $N_M$ | 31.7°C |
| 3 | 1 | $N_M$ | 32.1°C |
| ... | ... | ... | ... |
| $(N_R*N_M)-2$ | 1 | 1 | 37.5°C |
| $(N_R*N_M)-1$ | $N_R$ | 1 | 37.8°C |

[Figure 19]

| GROUP | TEMPERATURE, RBMS_ID, MBMS_ID | | | | | |
|---|---|---|---|---|---|---|
| 1 | 30.2°C, 1, $N_M$ | 31.7°C, $N_R$, $N_M$ | 32.1°C, 2, $N_M$ | ... | MT, $ID_R$, $ID_M$ | MT, $ID_R$, $ID_M$ |
| 2 | MT, $ID_R$, $ID_M$ | MT, $ID_R$, $ID_M$ | MT, $ID_R$, $ID_M$ | ... | MT, $ID_R$, $ID_M$ | MT, $ID_R$, $ID_M$ |
| 3 | MT, $ID_R$, $ID_M$ | MT, $ID_R$, $ID_M$ | MT, $ID_R$, $ID_M$ | ... | MT, $ID_R$, $ID_M$ | MT, $ID_R$, $ID_M$ |
| 4 | MT, $ID_R$, $ID_M$ | MT, $ID_R$, $ID_M$ | MT, $ID_R$, $ID_M$ | ... | MT, $ID_R$, $ID_M$ | MT, $ID_R$, $ID_M$ |
| 5 | MT, $ID_R$, $ID_M$ | MT, $ID_R$, $ID_M$ | MT, $ID_R$, $ID_M$ | ... | 37.5°C, 1, 1 | 37.8°C, $N_R$, 1 |

[Figure 20]

| GROUP | RBMS_ID, MBMS_ID, DEGREE OF OPENING OF AIR INLET | | | | | |
|---|---|---|---|---|---|---|
| 1 | 1, $N_M$, 0% | $N_R$, $N_M$, 0% | 2, $N_M$, 0% | ... | $ID_R$, $ID_M$, 0% | $ID_R$, $ID_M$, 0% |
| 2 | $ID_R$, $ID_M$, 25% | $ID_R$, $ID_M$, 25% | $ID_R$, $ID_M$, 25% | ... | $ID_R$, $ID_M$, 25% | $ID_R$, $ID_M$, 25% |
| 3 | $ID_R$, $ID_M$, 50% | $ID_R$, $ID_M$, 50% | $ID_R$, $ID_M$, 50% | ... | $ID_R$, $ID_M$, 50% | $ID_R$, $ID_M$, 50% |
| 4 | $ID_R$, $ID_M$, 75% | $ID_R$, $ID_M$, 75% | $ID_R$, $ID_M$, 75% | ... | $ID_R$, $ID_M$, 75% | $ID_R$, $ID_M$, 75% |
| 5 | $ID_R$, $ID_M$, 100% | $ID_R$, $ID_M$, 100% | $ID_R$, $ID_M$, 100% | ... | 1, 1, 100% | $N_R$, 1, 100% |

SYSTEM FOR PROVIDING COOLING AIR IN A BATTERY SYSTEM

TECHNICAL FIELD

This application claims priority to and the benefit of Korean Patent Application No. 10-2014-0143658 filed in the Korean Intellectual Property Office on Oct. 22, 2014, the entire contents of which are incorporated herein by reference.

The present invention relates to a system and a method for controlling a flow of cooling air in a battery system, which cool a battery system including a plurality of battery modules, and more particularly, to a system and a method for controlling a flow of cooling air in a battery system, in which a pipe connected to an outlet discharging cooling air of an air conditioning system and forming a flow path of the cooling air is included, and the pipe includes a plurality of module cooling ports corresponding to a plurality of battery modules, respectively, and makes the cooling air pass through each battery module through each module cooling port to cool the plurality of battery modules, so that it is possible to minimize the loss of coldness of the cooling air and supply the cooling air to each battery module, thereby decreasing the amount of energy consumed by the air conditioning system in order to maintain a constant temperature of the battery system. Further, the present invention relates to a system and a method for controlling a flow of cooling air in a battery system, in which it is not necessary to install fans for compulsorily circulating cooling air, which are installed in battery racks of a battery system in a container class in the related art, thereby decreasing the amount of fan driving power consumption and fan installation costs.

Further, the present invention relates to a system and a method for controlling a flow of cooling air in a battery system, which control opening/closing of an air inlet of a plurality of battery modules according to a temperature of each of the plurality of battery modules included in the battery system, so that it is possible to maintain or maximize a depth of discharge (DOD) of the battery system by decreasing a temperature deviation between the battery modules included in the battery system, and decrease a deviation of a state of health (SOH) between the battery modules.

BACKGROUND ART

In the case of a general air conditioning system in the related art, which is used in a battery system, such as a battery container for an energy storage system (ESS) including a plurality of battery racks, a temperature deviation between battery modules is inevitably generated according to positions of the battery rack and the battery module.

To describe in detail, the temperature deviation between the battery modules includes a temperature deviation portion according to a position by an air conditioning method, in addition to a self temperature increase portion through charging/discharging. A general air conditioning method in the related art in a battery system is a method of cooling a surface of a battery module while moving cold cooling air from a floor (or a ceiling) to the ceiling (or the floor). In the general air conditioning method in the related art, a temperature of the battery module close to a place where cold air is discharged is lower than that of the battery module positioned at an end of an opposite side of the place where cold air is discharged, that is, at a place where the cooling air after decreasing an overall temperature of the battery system enters. The reason is that the temperature of the cooling air itself is increased while the cooling air passes through a surface of each of the battery modules.

The temperature deviation between the battery modules according to a position in the general air conditioning system in the related art generally exerts a bad effect to two parts.

First, a depth of discharge (DOD) is decreased due to a temperature deviation diagnosis function of a battery system. The battery system adjusts a temperature deviation of a battery module not to exceed a predetermined level during a charging/discharging process through an autonomous temperature deviation diagnosis function. Accordingly, when the battery system fails to rapidly adjust the temperature deviation, so that the temperature deviation between the battery modules of the battery system exceeds the predetermined level, the temperature deviation diagnosis function of the battery system is operated, so that the battery system cannot sufficiently charging/discharging and may stop the charging/discharging. This results in damage to the DOD of the battery system.

Second, a state of health (SOH) (%) deviation is generated between the battery modules included in the battery system. A lithium ion cell, which is a main component of a lithium ion battery module mainly used in a power storage field, has a characteristic in that an SOH is different according to an operation temperature. For example, the more charging/discharging is repeated over a long time at a high temperature, rather than room temperature, the faster a degradation speed is. Accordingly, when a temperature deviation between the battery modules is continued over a long time due to a limit in solving a temperature deviation in the general air conditioning system in the related art in the battery system, a difference in an SOH between the battery modules may be increased. Further, when an SOH deviation between the racks/modules is increased, a battery capacity (state of charge (SOC)) or a voltage of the rack/module (more accurately, a specific cell) having a small SOH first reaches a charging/discharging limit value (0% or 100% of the SOC) than other racks/modules during the charging/discharging. Accordingly, even in this case, in the battery system, the SOC diagnosis function or a voltage diagnosis function is operated, so that the charging/discharging of the battery system may be stopped, and thus the DOD may be damaged.

DETAILED DESCRIPTION OF THE INVENTION

Technical Problem

An object of the present invention is to provide a system and a method for controlling a flow of cooling air in a battery system, in which a pipe connected to an outlet discharging cooling air of an air conditioning system and forming a flow path of the cooling air is included, and the pipe includes a plurality of module cooling ports corresponding to a plurality of battery modules, respectively, and makes the cooling air pass through each battery module through each module cooling port to cool the plurality of battery modules, so that it is possible to minimize the loss of coldness of the cooling air and supply the cooling air to each battery module, thereby decreasing the amount of energy consumed by the air conditioning system in order to maintain a constant temperature of the battery system. Another object of the present invention is to provide a system and a method for controlling a flow of cooling air in a battery system, in which it is not necessary to install fans for compulsorily circulating cooling air, which are installed in battery racks of a battery system in a container class in the related art, thereby decreasing the amount of fan driving power consumption and fan installation costs.

Still another object of the present invention is to provide a system and a method for controlling a flow of cooling air in a battery system, which control opening/closing of an air inlet of a plurality of battery modules according to a temperature of each of the plurality of battery modules included in the battery system, so that it is possible to maintain or maximize a depth of discharge (DOD) of the battery system by decreasing a temperature deviation between the battery modules included in the battery system, and decrease a deviation of a state of health (SOH) (%) between the battery modules.

Technical Solution

An exemplary embodiment of the present invention provides a system for controlling a flow of cooling air in a battery system for cooling the battery system including a plurality of battery modules, the system including: an air conditioning system which includes an outlet discharging cooling air for reducing a temperature of the plurality of battery modules, and an inlet taking in cooling air, of which a temperature is increased, after reducing the temperature of the plurality of battery modules; and a pipe, which includes a plurality of module cooling ports connected to the outlet, forming a flow path of the cooling air, and corresponding to the plurality of battery modules, respectively, and makes the cooling air discharged through the outlet pass through each battery module through each module cooling port to cool the plurality of battery modules.

The system may include the plurality of battery modules. Each of the battery modules may include: an air inlet which receives cooling air flowing from the module cooling port; and an air outlet which discharges the cooling air after reducing the temperature of the battery module.

The air inlet may be formed on one surface of the battery module, and the air outlet may be formed on the other surface facing the one surface of the battery module.

The air inlet may be fastened to the module cooling port, and the air inlet may be formed to be larger than the module cooling port.

The battery module may further include an opening/closing device which opens/closes the air inlet.

The opening/closing device may include: an opening/closing plate which is formed in a surrounding area of the air inlet and opens/closes the air inlet; a servo motor which provides power for opening and closing the opening/closing plate; a circular plate which is connected to the servo motor; and a connecting rod which connects the circular plate and the opening/closing plate, and transmits the power of the servo motor transmitted to the circular plate to the opening/closing plate and converts a rotational movement of the servo motor into a rectilinear movement of the opening/closing plate.

The battery module may further include a module control unit which controls an inflow quantity of cooling air flowing into the battery module by controlling the opening/closing of the air inlet by the opening/closing device.

The system may further include a system control unit which controls the opening/closing of the air inlet of the plurality of battery modules based on the temperature of each battery module measured by the module control unit of each of the plurality of battery modules.

When a temperature deviation between the battery module having the highest temperature and the battery module having the lowest temperature among the plurality of battery modules exceeds a predetermined temperature deviation reference value, the system control unit may individually control the opening/closing of the air inlet of each battery module in response to the temperature of each battery module.

The system control unit may sequentially align the temperature of the plurality of battery modules, group the plurality of battery modules into a plurality of groups according to the aligned temperature, and then allocate a degree of opening/closing of the air inlet in response to the group in which each battery module is included, and the module control unit of each battery module may control the opening/closing of the air inlet of the corresponding battery module according to the allocated degree of opening/closing of the air inlet.

When a temperature deviation between the battery module having the highest temperature and the battery module having the lowest temperature among the plurality of battery modules is equal to or less than the predetermined temperature deviation reference value, the system control unit may collectively control the opening/closing of the air inlets of all of the battery modules so as to reduce an average temperature of all of the battery modules.

When an average temperature of all of the battery modules is equal to or less than a predetermined average temperature reference value, the system control unit may collectively control the opening/closing of the air inlets of all of the battery modules so as to increase an average temperature of all of the battery modules.

Another exemplary embodiment of the present invention provides a method for controlling a flow of cooling air in a battery system for cooling the battery system including a plurality of battery modules, the method including:
discharging, by an air conditioning system, cooling air for reducing a temperature of the plurality of battery modules through an outlet; making, by a pipe including a plurality of module cooling ports, which is connected to the outlet, forms a flow path of the cooling air, and corresponds to the plurality of battery modules, respectively, the cooling air discharged through the outlet pass through each battery module through each module cooling port to cool the plurality of battery modules; and taking in, by the air conditioning system, the cooling air, of which a temperature is increased, after reducing the temperature of the plurality of battery modules through the inlet.

Each of the plurality of battery modules may include:
an air inlet which receives cooling air flowing from the module cooling port; an air outlet which discharges the cooling air after reducing the temperature of the battery module; an opening/closing device which opens/closes the air inlet; and a module control unit which controls an inflow quantity of cooling air flowing into the battery module by controlling the opening/closing of the air inlet by the opening/closing device.

The method may further include controlling, by a system control unit, the opening/closing of the air inlet of the plurality of battery modules based on the temperature of each battery module measured by the module control unit of each of the plurality of battery modules.

The controlling of the opening/closing of the air inlet of the plurality of battery modules may include, when a temperature deviation between the battery module having the highest temperature and the battery module having the lowest temperature among the plurality of battery modules exceeds a predetermined temperature deviation reference value, individually controlling, by the system control unit, the opening/closing of the air inlet of each battery module in response to the temperature of each battery module.

The individually controlling of the opening/closing of the air inlet of each battery module in response to the temperature of each battery module may include: sequentially aligning, by the system control unit, the temperature of the plurality of battery modules; grouping, by the system control unit, the plurality of battery modules into a plurality of groups according to the aligned temperature; allocating, by the system control unit, a degree of opening/closing of the air inlet in response to the group in which each battery module is included; and controlling the opening/closing of the air inlet of the corresponding battery module according to the allocated degree of opening/closing of the air inlet.

The controlling of the opening/closing of the air inlet of the plurality of battery modules may include, when a temperature deviation between the battery module having the highest temperature and the battery module having the lowest temperature among the plurality of battery modules is equal to or less than the predetermined temperature deviation reference value, collectively controlling, by the system control unit, the opening/closing of the air inlets of all of the battery modules so as to reduce an average temperature of all of the battery modules.

The controlling of the opening/closing of the air inlet of the plurality of battery modules may include, when an average temperature of all of the battery modules is equal to or less than a predetermined average temperature reference value, collectively controlling the opening/closing of the air inlets of all of the battery modules so as to increase an average temperature of all of the battery modules.

Advantageous Effects

According to one aspect of the present invention, it is possible to provide a system and a method for controlling a flow of cooling air in a battery system, in which a pipe connected to an outlet discharging cooling air of an air conditioning system and forming a flow path of the cooling air is included, and the pipe includes a plurality of module cooling ports corresponding to a plurality of battery modules, respectively, and makes the cooling air pass through each battery module through each module cooling port to cool the plurality of battery modules, so that it is possible to minimize the loss of coldness of the cooling air and supply the cooling air to each battery module, thereby decreasing the amount of energy consumed by the air conditioning system in order to maintain a constant temperature of the battery system. Further, it is possible to provide the system and the method for controlling a flow of cooling air in a battery system, in which it is not necessary to install fans for compulsorily circulating cooling air, which are installed in battery racks of a battery system in a container class in the related art, thereby decreasing the amount of fan driving power consumption and fan installation costs.

Furthermore, according to another aspect of the present invention, it is possible to provide the system and the method for controlling a flow of cooling air in a battery system, which control opening/closing of an air inlet of a plurality of battery modules according to a temperature of each of the plurality of battery modules included in the battery system, so that it is possible to maintain or maximize a depth of discharge (DOD) of the battery system by decreasing a temperature deviation between the battery modules included in the battery system, and decrease a deviation of a state of health (SOH) (%) between the battery modules.

BRIEF DESCRIPTION OF DRAWINGS

FIG. 1 is a diagram schematically illustrating a battery management system applicable to a system for controlling a flow of cooling air in a battery system according to an exemplary embodiment of the present invention.

FIG. 2 is a diagram illustrating an air conditioning system of a battery system in the related art.

FIG. 3 is a diagram illustrating an air conditioning system and a pipe of the system for controlling a flow of cooling air in the battery system according to the exemplary embodiment of the present invention.

FIG. 4 is a diagram illustrating a state where battery racks are fastened to a pipe of the system for controlling a flow of cooling air in the battery system according to the exemplary embodiment of the present invention.

FIG. 5 is a diagram illustrating a rear surface of a battery module of the system for controlling a flow of cooling air in the battery system according to the exemplary embodiment of the present invention.

FIG. 6 is a diagram illustrating a front surface of the battery module of the system for controlling a flow of cooling air in the battery system according to the exemplary embodiment of the present invention.

FIG. 7 is a diagram illustrating a state where battery modules are fastened to the pipe of the system for controlling a flow of cooling air in the battery system according to the exemplary embodiment of the present invention.

FIGS. 8 and 9 are diagrams illustrating an opening/closing device of the battery module of the system for controlling a flow of cooling air in the battery system according to the exemplary embodiment of the present invention.

FIG. 10 is a diagram illustrating an opening/closing operation of the opening/closing device of the battery module of the system for controlling a flow of cooling air in the battery system according to the exemplary embodiment of the present invention.

FIGS. 11 to 14 are tables for describing an example of controlling a temperature of the battery module by a process of controlling a temperature of the battery module in the system and a method for controlling a flow of cooling air in the battery system according to the exemplary embodiment of the present invention.

FIG. 15 is a flowchart for describing the process of controlling a temperature of the battery module in the system and the method for controlling a flow of cooling air in the battery system according to the exemplary embodiment of the present invention.

FIG. 16 is a flowchart for describing a process of controlling a temperature deviation between the battery modules in the system and the method for controlling a flow of cooling air in the battery system according to the exemplary embodiment of the present invention.

FIGS. 17 to 20 are tables for describing an example of controlling a temperature deviation between the battery modules by the process of controlling the temperature deviation between the battery modules in the system and the method for controlling a flow of cooling air in the battery system according to the exemplary embodiment of the present invention.

Best Mode

The present invention will be described in detail below with reference to the accompanying drawings. Herein, repeated descriptions and the detailed description of a publicly known function and configuration that may make the gist of the present invention unnecessarily ambiguous will be omitted. Exemplary embodiments of the present invention are provided so as to more completely explain the present invention to those skilled in the art. Accordingly, the shape, the size, etc., of elements in the figures may be exaggerated for more clear explanation.

Throughout the specification and the claims, unless explicitly described to the contrary, the word "include/comprise" and variations such as "includes/comprises" or "including/comprising" mean further including other constituent elements, not excluding the other constituent elements.

In addition, the term ". . . unit" described in the specification means a unit for processing at least one function and operation and may be implemented by hardware components, software components, or combinations thereof.

Before describing a system and a method for controlling a flow of cooling air in a battery system according to an exemplary embodiment of the present invention, the necessity of controlling a temperature of a battery system will be described.

A temperature element, which needs to be controlled in an aspect of efficiency of an operation of a battery system, is an "average temperature" of a battery module and a "temperature deviation" between battery modules. The two elements influence a "state of health (SOH) (%)" and a "depth of discharge (DOD)" as shown in the flowing Table 1.

TABLE 1

|  | SOH | DOD |
|---|---|---|
| Average temperature of battery module | Influence: Large | Influence: Small |
| Temperature deviation between battery modules | Influence: Almost none (a large influence on degradation deviation between battery modules) | Influence: Large |

In the SOH, a degradation speed of a battery is increased in an order of low temperature—high temperature—room temperature based on an average temperature of the battery module. Accordingly, in order to increase a life of the battery module, it is necessary to maintain an average temperature of the battery module at a room temperature in the battery system.

Further, in the DOD, the DOD is influenced by a result of diagnosing a temperature deviation between the battery modules. Accordingly, in order to prevent a situation, in which the battery system is warned or has a fault as a result of diagnosing a temperature of the battery system such that the battery system stops charging/discharging of a battery, it is necessary to decrease a temperature deviation between the battery modules.

FIG. 1 is a diagram schematically illustrating a battery management system applicable to a system for controlling a flow of cooling air in a battery system according to an exemplary embodiment of the present invention.

Referring to FIG. 1, a battery management system (BMS) may be installed in a battery system, such as a battery container, and may have a three-layer structure.

A module battery management system (MBMS) 1 is provided to a battery module, and serves to monitor a state of the battery module and transmit the monitored state to a rack battery management system (RBMS) 2. The MBMS 1 may be provided as many as the number $N_M$ of subordinate battery modules included in a corresponding battery rack.

The RBMS 2 is provided in the battery rack, and performs a diagnosis or protection operation based on a state of the subordinate battery module included in the corresponding battery rack and state information at a rack level of a current, a voltage, and the like applied to the corresponding battery rack. Further, the RBMS 2 serves to transmit state information about the battery module and the battery rack to a bank battery management system (BBMS) 3. The RBMS 2 may be provided as many as the number $N_R$ of the battery racks included in the corresponding battery container.

The BBMS 3 is provided in the battery container, and determines an optimal battery system operating method based on transmission data of subordinate battery racks and takes appropriate measures. Further, the BBMS 3 transmits battery system state information (comprehensive information) to a power control system (PCS).

The MBMS 1 and the RBMS 2, and the RBMS 2 and the BBMS 3 are connected through controller area network (CAN) communication, so that the MBMS 1 and the RBMS 2, and the RBMS 2 and the BBMS3 may exchange signals.

The BMS including the aforementioned structure is applied to the system and a method for controlling a flow of cooling air in the battery system according to the exemplary embodiment of the present invention, thereby controlling an average temperature and a temperature deviation of the battery module.

FIG. 2 is a diagram illustrating an air conditioning system of a battery system in the related art.

Referring to FIG. 2, a battery system 10 in the related art receives cooling air from an air conditioning system 11 to cool a battery rack 12 and battery modules 12-1 and 12-2 within the battery system 10.

However, in the battery system 10 in the related art, the cooling air is transferred to all of the battery modules 12-1 and 12-2 with a similar flow rate, so that it is possible to decrease an average temperature of the battery modules 12-1 and 12-2 installed within the battery system 10, but there is a limit in decreasing a temperature deviation between the battery modules 12-1 and 12-2.

In the battery system 10 in the related art, a flow of cooling air by the air conditioning system 11 is generally divided into an ascending flow in a direction from a floor to a ceiling and a descending flow in a direction from a ceiling to a floor. In both the flow schemes, cooling air ascends or descends while cooling the battery modules 12-1 and 12-2 in a stack structure one by one, and a temperature of cooling air itself when the cooling air reaches the last battery module 12-2 may be higher than that when the cooling air reaches the first battery module 12-1. Accordingly, it is not easy to decrease a temperature deviation between the battery modules 12-1 and 12-2 by the scheme by the air conditioning system 11 in the battery system 10 in the related art, and the scheme may cause an increase in a temperature deviation between the battery modules 12-1 and 12-2.

Hereinafter, the system and the method for controlling a flow of cooling air in the battery system according to the exemplary embodiment of the present invention, which solve the problem of the scheme by the air conditioning system 11 in the battery system 10 in the related art, will be described with reference to the accompanying drawings.

Referring to FIGS. 3 to 10, a system 100 for controlling a flow of cooling air in the battery system according to the exemplary embodiment of the present invention may include an air conditioning system 110, a pipe 120, and a plurality of battery modules 130. The system 100 for controlling a flow of cooling air in the battery system illustrated in FIGS. 3 to 10 is an exemplary embodiment, and the constituent elements thereof are not limited to the exemplary embodiment illustrated in FIGS. 3 and 10, and some constituent elements may be added, changed, or removed as necessary.

In the exemplary embodiment, the system 100 for controlling a flow of cooling air in the battery system according to the exemplary embodiment of the present invention may also be included and implemented in the battery system, and may also be implemented as a battery system itself.

FIG. 3 is a diagram illustrating an air conditioning system and a pipe of the system for controlling a flow of cooling air in the battery system according to the exemplary embodiment of the present invention.

Referring to FIG. 3, the air conditioning system 110 may include an outlet 111 discharging cooling air for reducing a temperature of the plurality of battery modules 130, and an inlet 112 taking in cooling air, of which a temperature is increased, after reducing the temperature of the plurality of battery modules 130.

The pipe 120 includes a plurality of module cooling ports 121, which is connected to the outlet 111 of the air conditioning system 110, forms a flow path of cooling air, and corresponds to the plurality of battery modules 130, respectively, and makes the cooling air discharged through the outlet 111 pass through each battery module 130 through each module cooling port 121 to cool the plurality of battery modules 130.

In the exemplary embodiment, the cooling air passing through the air conditioning system 110 reaches a rear surface of each battery module 130 via the pipe 120. The cooling air arriving at the rear surface of the battery module 130 flows into the battery module 130 through an air inlet 131 located on the rear surface of the battery module 130 and reduces a temperature inside the battery module 130, and then is discharged to the outside of the battery module 130 through an air outlet 132 located on a front portion of the battery module and flows back into the air conditioning system 110.

FIG. 4 is a diagram illustrating a state where battery racks are fastened to the pipe of the system for controlling a flow of cooling air in the battery system according to the exemplary embodiment of the present invention.

Referring to FIG. 4, the pipe 120 of the system 100 for controlling a flow of cooling air in the battery system according to the exemplary embodiment of the present invention is fastened to the rear surface of each battery module 130 included in a battery rack 130'. As described above, when a flow of cooling air is controlled by using the pipe 120, it is possible to maintain a temperature of the cooling air arriving at the rear surfaces of all of the battery modules 130 installed in the battery rack 130' within the battery system at a predetermined level, so that it is possible to decrease a temperature deviation between the battery modules 130.

Further, it is possible to decrease an average temperature of the battery module 130 and the amount of energy consumed for decreasing a temperature deviation between the battery modules 130 by minimizing a temperature loss of the cooling air, thereby saving energy.

In the exemplary embodiment, the air conditioning system 110 may further include a temperature measuring unit 113 measuring a temperature of the temperature-increased cooling air, which enters the inlet 112, and an air conditioning control unit 114 controlling a temperature and an air volume of cooling air supplied to the battery system in response to the temperature of the cooling air discharged through the air outlet 132 located on the front portion of the battery module 130. The air conditioning system 110 may autonomously adjust cooling air through the temperature measuring unit 113 and the air conditioning control unit 114, and in this case, the communication between the air conditioning system 110 and the BMS is not required. For example, the air conditioning system 110 adjusts cooling air based on a temperature of cooling air of the battery system (container) measured through the temperature measuring unit 113. The cooling air generated by the air conditioning system 110 has an increased temperature while passing through the inside of the battery module 130, and the temperature-increased cooling air is sucked back into the air conditioning system 130.

FIG. 5 is a diagram illustrating the rear surface of the battery module of the system for controlling a flow of cooling air in the battery system according to the exemplary embodiment of the present invention, FIG. 6 is a diagram illustrating a front surface of the battery module of the system for controlling a flow of cooling air in the battery system according to the exemplary embodiment of the present invention, and FIG. 7 is a diagram illustrating a state where the battery modules are fastened to the pipe of the system for controlling a flow of cooling air in the battery system according to the exemplary embodiment of the present invention.

As described above, the system 100 for controlling a flow of cooling air in the battery system according to the exemplary embodiment of the present invention may also be included and implemented in the battery system, and may also be implemented as a battery system itself, and in this case, the system 100 for controlling a flow of cooling air in the battery system according to the exemplary embodiment of the present invention may include the battery modules 130. Hereinafter, the battery module 130 of the system 100 for controlling a flow of cooling air in the battery system according to the exemplary embodiment of the present invention will be described in detail.

Referring to FIGS. 5 to 7, the battery module 130 of the system 100 for controlling a flow of cooling air in the battery system according to the exemplary embodiment of the present invention may include the air inlet 131 receiving cooling air flowing from the module cooling port 121 of the pipe 120, and the air outlet 132 discharging the cooling air, which had reduced a temperature of the battery module 130.

In the exemplary embodiment, in the battery module 130, in order to maintain a flow of cooling air in one direction, the air inlet 131 may be formed on one surface of the battery module 130 and the air outlet 132 may be formed on the other surface facing the one surface of the battery module 130. FIGS. 5 and 6 illustrate an example, in which the air inlet 131 is formed on the rear surface of the battery module 130 and the air outlet 132 is formed on the front surface of the battery module 130. In this case, the air outlet 132 is not formed on an upper surface, a lower surface, and both side surfaces of the battery module. The reason is, as illustrated in FIG. 7, to make the cooling air reach up to battery cells (see 135 in FIG. 9) located on the front portion of the battery module 130 to decrease a temperature deviation between the battery cells (see 135 FIG. 9) within the battery module 130.

In the exemplary embodiment, the air inlet 131 is fastened to the module cooling port 121 of the pipe 120 as illustrated in FIGS. 5 and 7, and the air inlet 131 may be formed to be larger than the module cooling port 121. Accordingly, the module cooling port 121 of the pipe 120 is fastened to be inserted into the air inlet 131, so that the cooling air may flow into the battery module 130 without a loss.

FIGS. 8 and 9 are diagrams illustrating an opening/closing device of the battery module of the system for controlling a flow of cooling air in the battery system according to the exemplary embodiment of the present invention, and FIG. 10 is a diagram illustrating an opening/closing operation of the opening/closing device of the battery module of the system for controlling a flow of cooling air in the battery system according to the exemplary embodiment of the present invention.

The battery module 130 of the system for controlling a flow of cooling air in the battery system according to the exemplary embodiment of the present invention may further include an opening/closing device 133 opening/closing the air inlet 131 for controlling an inflow quantity of cooling air within the battery module 130.

Referring to FIGS. 8 and 9, the opening/closing device 133 may include an opening/closing plate 133-1 formed in a surrounding area of the air inlet 131 and open/close the air inlet 131, a servo motor 133-2 providing power for opening and closing the opening/closing plate 133-1, a circular plate 133-3 connected to the servo motor 133-2, and a connecting rod 133-4 connecting the circular plate 133-3 and the opening/closing plate 133-1 and transferring the power of the servo motor 133-2 transmitted to the circular plate 133-3 to the opening/closing plate 133-1 and converting a rotational movement of the servo motor 133-2 into a rectilinear movement of the opening/closing plate 133-1.

Referring to FIG. 10, the opening/closing device 133 of the battery module 130 of the system for controlling a flow of cooling air in the battery system according to the exemplary embodiment of the present invention may increase a degree of opening/closing of the air inlet 131 by rotating the servo motor 133-2 in a clockwise direction, or may decrease a degree of opening/closing of the air inlet 131 by rotating the servo motor 133-2 in a counterclockwise direction. FIG. 10A illustrates a case where the air inlet 131 is completely closed, that is, a degree of opening/closing is 0%, FIG. 10B illustrates a case where the air inlet 131 is about half opened, that is, a degree of opening/closing is 50%, and FIG. 10C illustrates a case where the air inlet 131 is completely opened, that is, a degree of opening/closing is 100%.

The opening/closing device 133 may be controlled by a module control unit 134 included in the battery module 130. In the exemplary embodiment, the module control unit 134 may control an inflow quantity of cooling air flowing into the battery module 130 by controlling the opening/closing of the air inlet 131 by the opening/closing device 133. Further, the module control unit 134 may correspond to the MBMS (see 1 in FIG. 1) controlling each battery module.

Referring back to FIG. 4, the system 100 for controlling a flow of cooling air in the battery system according to the exemplary embodiment of the present invention may further include a system control unit 140 controlling the opening/closing of the air inlets 131 of the plurality of battery modules 130 based on the temperature of each battery module 130 measured by the module control unit 134 of each of the plurality of battery modules 130. The system control unit 140 may correspond to the RBMS (see 2 in FIG. 1) controlling the battery rack and the subordinate battery module included in the corresponding battery rack, or the BBMS (see 3 in FIG. 1) controlling the battery container, the subordinate battery racks included in the corresponding battery container, and the whole battery modules.

Hereinafter, a particular process of controlling an average temperature of the battery module 130 and a temperature deviation between the battery modules 130 by controlling the opening/closing device 133 included in the plurality of battery modules 130, which may be performed by the system control unit 140 of the system 100 for controlling a flow of cooling air in the battery system according to the exemplary embodiment of the present invention, and an example thereof will be described.

FIGS. 11 to 14 are tables for describing an example of controlling a temperature of the battery module by a process of controlling a temperature of the battery module in the system and the method for controlling a flow of cooling air in the battery system according to the exemplary embodiment of the present invention.

In the system and the method for controlling a flow of cooling air in the battery system according to the exemplary embodiment of the present invention, a process of controlling a temperature of a battery module may be generally divided into a "module temperature deviation control section", a "module average temperature control section", and a "module temperature control stop section".

The "module temperature deviation control section" is a section, in which a degree of opening/closing of the air inlet 131 of each battery module 130 is individually controlled in order to decrease a temperature deviation between the battery modules 130 below a specific level. For example, the "module temperature deviation control section" may be a section, in which a temperature deviation between the battery modules 130 is decreased up to less than 2.0° C. In the "module temperature deviation control section", when a temperature deviation between the battery module having the highest temperature and the battery module having the lowest temperature among the plurality of battery modules 130 exceeds a predetermined temperature deviation reference value, the system control unit 140 may individually control the opening/closing of the air inlet 131 of each battery module 130 in response to a temperature of each battery module 130.

The "module average temperature control section" is a section, in which the degrees of opening/closing of the air inlets 131 of all of the battery modules 130 are controlled to be 100% in order to uniformly reduce the temperatures of all of the battery modules 130, that is, reduce an average temperature of the plurality of battery modules 130. In the "module average temperature control section", when a temperature deviation between the battery module having the highest temperature and the battery module having the lowest temperature among the plurality of battery modules 130 is equal to or less than the predetermined temperature deviation reference value, the system control unit 140 may collectively control the opening/closing of the air inlets 131 of all of the battery modules 130 so as to reduce an average temperature of all of the battery modules 130.

The "module temperature control stop section" is a section, in which degrees of opening/closing of the air inlets 131 of all of the battery modules 130 are controlled to be 0% in order to prevent an average temperature of the battery modules 130 from being excessively reduced. In the "module temperature control stop section", when an average temperature of all of the battery modules 130 is equal to or less than a predetermined average temperature reference value, the system control unit 140 may collectively control the opening/closing of the air inlets 131 of all of the battery modules 130 so as to increase the average temperature of all of the battery modules 130.

Referring to FIG. 11, a temperature for each battery module 130 before performing the process of controlling a temperature of the battery module by the system and the method for controlling a flow of cooling air in the battery system according to the exemplary embodiment of the present invention is represented. MT means a module temperature of each battery module 130, $N_R$ means the number of battery racks 130' within the battery system, and $N_m$ means the number of battery modules within the battery rack 130'. In FIG. 11, it can be seen that a temperature deviation between the battery modules 130 having the highest temperature and the lowest temperature within the battery rack 130' ranges from 4.8° C. to 7.3° C.

Referring to FIG. 12, an example, in which the "module temperature deviation control section" is operated such that a degree of opening/closing of the air inlet 131 of each battery module 130 is individually controlled in the process of controlling a temperature of the battery module by the system and the method for controlling a flow of cooling air in the battery system according to the exemplary embodiment of the present invention, is illustrated. In FIG. 12, it is possible to confirm an example, in which a degree of opening/closing of the air inlet 131 is individually controlled according to a module temperature MT of the battery module by controlling a degree of opening/closing of the air inlet 131 to be 100% in the battery module 130 having a module temperature MT of 37° C. or more, by controlling a degree of opening/closing of the air inlet 131 to be 75% in the battery module 130 having a module temperature MT of 36° C. or more and less than 37° C., by controlling a degree of opening/closing of the air inlet 131 to be 50% in the battery module 130 having a module temperature MT of 35° C. or more and less than 36° C., by controlling a degree of opening/closing of the air inlet 131 to be 25% in the battery module 130 having a module temperature MT of 31° C. or more and less than 35° C., and by controlling a degree of opening/closing of the air inlet 131 to be 0% in the battery module 130 having a module temperature MT of less than 31° C. in FIG. 11.

Referring to FIG. 13, an example, in which a temperature deviation between the battery modules 130 is controlled to be less than a predetermined level by individually controlling a degree of opening/closing of the air inlet 131 through an operation of the "module temperature deviation control section" illustrated in FIG. 12 and maintaining the controlled degree of opening/closing for a predetermined time, is illustrated. In FIG. 13, it can be seen that a temperature deviation between the battery modules 130 having the highest temperature and the lowest temperature within the battery rack 130' ranges from 1.3° C. to 1.9° C., which is controlled to be less than 2° C.

Referring to FIG. 14, an example, in which the "module average temperature control section" is operated, so that the degrees of opening/closing of the air inlets 131 of all of the battery modules 130 are controlled to be 100% in the process of controlling a temperature of the battery module by the system and the method for controlling a flow of cooling air in the battery system according to the exemplary embodiment of the present invention, is illustrated. In FIG. 14, it is possible to confirm an example, in which a temperature deviation between the battery modules 130 is controlled to be less than 2° C., so that the air inlets 131 of all of the battery modules 130 are controlled to be opened 100% in order to reduce an average temperature of all of the battery modules 130.

Hereinafter, the process of controlling a temperature of the battery module in the system and the method for controlling a flow of cooling air in the battery system according to the exemplary embodiment of the present invention will be described in detail with reference to the flowchart of FIG. 15.

FIG. 15 is a flowchart for describing the process of controlling a temperature of the battery module in the system and the method for controlling a flow of cooling air in the battery system according to the exemplary embodiment of the present invention.

The process of controlling a temperature of the battery module, which is illustrated in FIG. 15, may be performed by the system control unit 140 of the system 100 for controlling a flow of cooling air in the battery system according to the exemplary embodiment of the present invention. Further, a processing period of the process of controlling a temperature of the battery module of FIG. 15 may be one second.

Referring to FIG. 15, when the process of controlling a temperature of the battery module in the system and the method for controlling a flow of cooling air in the battery system according to the exemplary embodiment of the present invention starts, an air inlet status maintenance counter (ISMC) is first set to 0 (S1501). The ISMC is a counter value determining a time, for which a degree of opening/closing of the air inlet 131 is maintained in the set status.

Further, a module temperature MT for each battery rack 130' or each battery module 130 is collected (S1502). Then, a temperature deviation MT_dev between the battery modules 130 is calculated by calculating a difference value between a maximum value MT_max of the temperature of the battery module and a minimum value MT_min of the temperature of the battery module for each battery rack 130' (S1503). The operation S1503 may be performed through the RBMS provided for each battery rack 130'.

Then, an average temperature MT_avg of module temperatures MTs of all of the battery modules is calculated, and the calculated average temperature MT_avg is compared with an average temperature reference value B (S1504). The average temperature reference value B is a reference value for determining whether the value of the corresponding average temperature MT_avg corresponds to a value representing the need to operate the "module average temperature control section" or the "module temperature deviation control section", or a value representing the need to operate the "module average temperature control stop section", and the average temperature reference value B is an optimal value according to an operation environment of the battery system, and may be set as an initial value, or may be set by a user, for example, 30° C.

When the average temperature MT_avg of the module temperatures of all of the battery modules exceeds the average temperature reference value B in operation S1504, it is checked whether the ISMC is 0 (S1505), and when the ISMC is not 0, the ISMC is deducted by 1 (S1506) and the process returns to operation S1502, and when the ISMC is 0, the process proceeds to a next operation S1507.

Then, the temperature deviation MT_dev between the battery modules 130 is compared with a temperature deviation reference value A (S1507). The temperature deviation reference value A is a reference value for determining whether the value of the corresponding temperature deviation MT_dev corresponds to a value representing the need to operate the "module average temperature control section" or the "module temperature deviation control section", and the temperature deviation reference value A is an optimal value according to an operation environment of the battery system, and may be set as an initial value, or may be set by a user, for example, 5° C.

When the temperature deviation MT_dev between the battery modules 130 exceeds the temperature deviation reference value A in operation S1507, a degree of opening/closing of the air inlet of each battery module 130 is individually set in response to a temperature of each battery module 130 in order to operate the "module temperature deviation control section" (S1508).

When the temperature deviation MT_dev between the battery modules 130 is equal to or less than the temperature deviation reference value A in operation S1507, in order to operate the "module average temperature control section", degrees of opening/closing of the air inlets 131 of all of the battery modules 130 are collectively set so as to reduce the average temperature of all of the battery modules 130 (S1509). In this case, the degrees of opening/closing of the air inlets 131 of all of the battery modules 130 may be set to 100%.

After operation S1508 or S1509, the ISMC is set as an air inlet opening/closing status maintenance time C (S1510). The air inlet opening/closing status maintenance time C is a time C, for which an air inlet opening/closing status is maintained for controlling a temperature of the battery module, and is an optimal value according to an operation environment of the battery system, and may be set to an initial value or may be set by a user, for example, 60 seconds or 600 seconds.

When the average temperature MT_avg of the module temperatures MTs of all of the battery modules is equal to or less than the average temperature reference value B in operation S1504, in order to operate the "module temperature control stop section", the degrees of the opening/closing of the air inlets 131 of all of the battery modules 130 are collectively set so as to increase the average temperature of all of the battery modules 130 (S1511). In this case, the degrees of opening/closing of the air inlets 131 of all of the battery modules 130 may be set to 0%.

After operation S1511, the ISMC is set to 0 (S1512).

As described above, after operating any one of the "module temperature deviation control section", the "module average temperature control section", and the "module temperature control stop section", the determined degree of opening/closing of the air inlet 131 for each battery module 130 is transmitted to each module control unit 134 via the system control unit 140 (S1513), so that each battery module 130 may control the opening/closing device 133 according to the degree of opening/closing of the corresponding air inlet 131 to open/close the air inlet 131.

FIG. 16 is a flowchart for describing a process of controlling a temperature deviation between the battery modules in the system and the method for controlling a flow of cooling air in the battery system according to the exemplary embodiment of the present invention, and FIGS. 17 to 20 are tables for describing an example of controlling a temperature deviation between the battery modules by the process of controlling the temperature deviation between the battery modules in the system and the method for controlling a flow of cooling air in the battery system according to the exemplary embodiment of the present invention.

The process illustrated in FIG. 16 particularly describes the process corresponding to operation S1508 of FIG. 15.

When the process of controlling the temperature deviation between the battery modules starts, temperatures of all of the battery modules 130 within the battery system are first aligned in an ascending order (S1601). FIG. 17 represents a temperature for each battery module 130 before performing the process of controlling a temperature deviation between the battery modules by the system and the method for controlling a flow of cooling air in the battery system according to the exemplary embodiment of the present invention. Further, FIG. 18 illustrates an example, in which a temperature for each battery module 130 illustrated in FIG. 17 is aligned in an ascending order. In FIG. 18, NR means the number of battery racks 130' within the battery system, and $N_M$ means the number of battery modules within the battery rack 130'. An RBMS ID means an identification number of the RMBS of the battery rack 130', in which the corresponding battery module 130 is included, and an MBMS ID means an identification number of the MBMS of the corresponding battery module 130.

When the temperatures of all of the battery modules 130 within the battery system are aligned in the ascending order as illustrated in FIG. 18, the plurality of battery modules 130 is grouped into a plurality of groups according to the aligned temperatures (S1602). FIG. 19 illustrates an example, in which the plurality of battery modules 130 is grouped into five groups in an order of the aligned temperature from a low temperature to a high temperature.

Then, the degrees of opening/closing of the air inlet are allocated in response to the group in which each battery module is included (S1603). FIG. 20 illustrates an example, in which the degrees 0%, 25%, 50%, 75%, and 100% of opening/closing of the air inlets are allocated in response to the group in which each battery module is included.

In the system and the method for controlling a flow of cooling air in the battery system according to the exemplary embodiment of the present invention, the number of groups, that is, the number of types of the degree of opening/closing of the air inlet, may be determined in accordance with a requirement of accuracy in the temperature control, and when the number of groups is increased, it is possible to control a temperature with high accuracy. In FIGS. 17 to 20, it is assumed that the number of groups is five, but the number is in accordance with the exemplary embodiment, and the number of groups may be adjusted as necessary.

In the forgoing, the specific exemplary embodiment of the present invention has been illustrated and described, but it is obvious to those skilled in the art that the technical spirit of the present invention is not limited by the accompanying drawings and the described contents, and may be modified in various forms without departing from the spirit of the present invention, and the modifications are considered to belong to the claims of the present invention without departing from the spirit of the present invention.

The invention claimed is:

1. A system comprising:
   a battery system, wherein the battery system includes a plurality of battery modules;
   an air conditioning system which includes an outlet configured to discharge cooling air passing through the plurality of battery modules for reducing a temperature of the plurality of battery modules, and an inlet configured to take in cooling air; and
   a pipe which includes a plurality of module cooling ports connected to the outlet, wherein the module cooling ports form a flow path of the cooling air and correspond to the plurality of battery modules, respectively, wherein the pipe is configured to discharge cooling air through each battery module through each module cooling port to cool the plurality of battery modules, wherein each of the battery modules includes:
- an air inlet connected to a respective module cooling port;
- an air outlet; and
- an opening/closing device configured to open/close the air inlet, wherein the opening/closing device includes:
  - a servo motor;
  - an opening/closing plate formed in a surrounding area of the air inlet and configured to open/close the air inlet;
  - a circular plate which is connected to the servo motor, wherein the servo motor is configured to rotate the circular plate; and
  - a connecting rod connecting the circular plate to the opening-closing plate.

2. The system of claim 1, wherein each air inlet is formed on a first surface of the respective battery module, and
wherein each air outlet is formed on a second surface of the respective battery module facing the first surface of the respective battery module.

3. The system of claim 1, wherein each air inlet is formed to be larger than the respective module cooling port.

4. The system of claim 1,
wherein each connecting rod is configured to convert a rotational movement of the servo motor via the respective circular plate into a rectilinear movement of the respective opening/closing plate.

5. The system of claim 1, wherein each battery module further includes a module controller configured to monitor a state of the respective battery module and to transmit the monitored state to a system controller, and wherein the system controller controls an inflow quantity of cooling air flowing into the each battery module.

6. The system of claim 5, wherein each module controller is configured to monitor the temperature of the respective battery module, and
wherein the system controller is configured to control the opening/closing of the air inlet of each of the plurality of battery modules based on the temperature of each battery module measured by the respective module controller.

7. The system of claim 6, wherein, in response to a temperature deviation between the battery module having the highest temperature and the battery module having the lowest temperature among the plurality of battery modules exceeding a predetermined temperature deviation reference value, the system controller is configured to individually control the opening/closing of the air inlet of each battery module based on the temperature of each battery module.

8. The system of claim 7, wherein the system controller is configured to:
- sequentially align the temperature of the plurality of battery modules,
- group the plurality of battery modules into a plurality of groups according to the aligned temperature, and
- then allocate a degree of opening/closing of the air inlet in response to the group in which each battery module is included, and
wherein each battery module controls the opening/closing of the respective air inlet according to the allocated degree of opening/closing of the air inlet.

9. The system of claim 6, wherein, in response to a temperature deviation between the battery module having the highest temperature and the battery module having the lowest temperature among the plurality of battery modules being equal to or less than a predetermined temperature deviation reference value, the system controller is configured to collectively control the opening/closing of the air inlets of all of the battery modules to reduce an average temperature of all of the battery modules.

10. The system of claim 6, wherein, in response to an average temperature of all of the battery modules being equal to or less than a predetermined average temperature reference value, the system controller is configured to collectively control the opening/closing of the air inlets of all of the battery modules to increase an average temperature of all of the battery modules.

* * * * *